United States Patent
Bryan et al.

(10) Patent No.: US 11,467,947 B2
(45) Date of Patent: Oct. 11, 2022

(54) AUTOMATED MOCKING OF COMPUTER SYSTEM DEPLOYMENTS

(71) Applicant: EMC IP Holding Company LLC, Hopkinton, MA (US)

(72) Inventors: Matthew Bryan, Olympia, WA (US); Shiv Shankar Kumar, Pune (IN); Anurag Chandra, Pune (IN); Shubham Patil, Madhya Pradesh (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/074,019

(22) Filed: Oct. 19, 2020

(65) Prior Publication Data

US 2022/0121558 A1    Apr. 21, 2022

(51) Int. Cl.
  *G06F 11/36*    (2006.01)
  *G06F 8/60*    (2018.01)

(52) U.S. Cl.
  CPC ............ *G06F 11/3664* (2013.01); *G06F 8/60* (2013.01); *G06F 11/3692* (2013.01)

(58) Field of Classification Search
  CPC ..... G06F 8/60; G06F 11/3664; G06F 11/3692
  See application file for complete search history.

(56) References Cited

U.S. PATENT DOCUMENTS

| | | | |
|---|---|---|---|
| 6,748,429 B1 | 6/2004 | Talluri et al. | |
| 7,478,385 B2 * | 1/2009 | Sierer | G06F 8/61 717/174 |
| 7,865,888 B1 | 1/2011 | Qureshi et al. | |
| 8,418,150 B2 | 4/2013 | Thirumalai et al. | |
| 8,533,704 B2 * | 9/2013 | Wookey | G06F 8/658 717/174 |
| 8,819,673 B1 * | 8/2014 | Wilkinson | G06F 9/5022 718/1 |
| 9,477,454 B2 * | 10/2016 | Scheiner | G06F 8/61 |
| 10,031,783 B2 * | 7/2018 | Jalagam | G06F 8/61 |

(Continued)

OTHER PUBLICATIONS

Nash et al., "Composition of Mappings Given by Embedded Dependencies", Mar. 2007, ACM, vol. 32, No. 1 (Year: 2007).*

(Continued)

*Primary Examiner* — Wei Y Zhen
*Assistant Examiner* — Junchun Wu
(74) *Attorney, Agent, or Firm* — Amin, Turocy & Watson, LLP

(57) ABSTRACT

Systems and methods facilitating automated mocking of computer system deployments are described herein. A method as described herein can include associating, by a first system operatively coupled to a processor, respective properties of a first deployment of a second system on a first computing device with respective automation mapping functions; executing, by the first system, the automation mapping functions in an order defined by dependencies between respective ones of the automation mapping functions, resulting in a series of system modeling tasks and an order associated with the series of system modeling tasks; and performing, by the first system, the series of system modeling tasks in the order associated therewith, resulting in a second deployment of the second system being created on a second computing device that is distinct from the first computing device.

20 Claims, 10 Drawing Sheets

(56) References Cited

U.S. PATENT DOCUMENTS

| | | | | |
|---|---|---|---|---|
| 10,467,059 | B2* | 11/2019 | Derler | G06F 9/5066 |
| 10,579,966 | B1* | 3/2020 | Willson | G06F 8/20 |
| 2005/0289228 | A1 | 12/2005 | Srikanth et al. | |
| 2006/0020908 | A1* | 1/2006 | Jain | G06F 8/60 |
| | | | | 707/E17.116 |
| 2007/0118560 | A1* | 5/2007 | Bornhoevd | G06F 8/60 |
| 2009/0063225 | A1* | 3/2009 | Baeyens | G06Q 10/06 |
| | | | | 705/1.1 |
| 2010/0064035 | A1 | 3/2010 | Branca et al. | |
| 2011/0047527 | A1* | 2/2011 | Bird | G06F 8/30 |
| | | | | 717/106 |
| 2011/0265081 | A1* | 10/2011 | Lucovsky | G06F 8/60 |
| | | | | 717/177 |
| 2012/0117560 | A1* | 5/2012 | Vorthmann | G06F 8/60 |
| | | | | 717/177 |
| 2012/0144044 | A1 | 6/2012 | Verma | |
| 2016/0239280 | A1 | 8/2016 | Scheiner et al. | |
| 2018/0039486 | A1* | 2/2018 | Kulkarni | G06F 8/10 |
| 2019/0036765 | A1 | 1/2019 | Ghosal et al. | |
| 2019/0294528 | A1 | 9/2019 | Avisror et al. | |
| 2020/0045116 | A1* | 2/2020 | Deodhar | H04L 41/5051 |
| 2021/0011840 | A1* | 1/2021 | Zhou | G06F 11/3688 |
| 2021/0194803 | A1 | 6/2021 | Zolkover et al. | |
| 2022/0035733 | A1* | 2/2022 | Zhu | B60W 60/0027 |

OTHER PUBLICATIONS

Siasi et al., "Container-Based Service Function Chain Mapping", 2019, IEEE (Year: 2019).*

Dolstra, "Integrating Software Construction and Software Deployment", 2003, Springer-Verlag Berlin Heidelberg (Year: 2003).*

Spillner, "Transformation of Python Applications into Function-as-a-Service Deployments", Aug. 2018, ArXiv (Year: 2018).*

Notice of Allowance received for U.S. Appl. No. 17/078,885 dated Jul. 21, 2022, 27 pages.

Non-Final Office Action received for U.S. Appl. No. 17/077,742 dated Jun. 24, 2022, 36 pages.

Daniels et al., "Learning the Threshold in Hierarchical Agglomerative Clustering", IEEE 2006, Proceedings of the 5th International Conference on Machine Learning and Applications (ICMLA'06), 2006, 6 pages.

* cited by examiner

AUTOMATED MOCKING OF COMPUTER SYSTEM DEPLOYMENTS

TECHNICAL FIELD

The subject application is related to computer system testing, and more particularly, to techniques for recreating a deployment of a computer system for the purposes of testing.

BACKGROUND

Some computing systems, such as commercial network-attached storage (NAS) systems or the like, can be implemented with a high degree of flexibility and/or scalability in order to better tailor a particular computing system to the needs of a specific customer. For instance, different implementations of a computing system can vary significantly in size (e.g., number of computing devices or clusters, etc.), software features, configurations, users, etc., even within systems of a common computing platform. This potential for significant variation within computing systems of a common platform can, in turn, introduce large amounts of complexity to testing such systems that can render exhaustive system testing practically infeasible, e.g., within a useful or reasonable timeframe.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an aspect, a system is described herein. The system can include a memory that stores executable components and a processor that executes the executable components stored in the memory. The executable components can include an automation mapping component that associates respective properties of a first deployment of a data storage system on a first computing device with respective automation mapping functions. The executable components can further include a deployment modeling component that executes the automation mapping functions in an order defined by dependencies between the automation mapping functions, resulting in an ordered series of deployment modeling tasks. The executable components can further include a deployment transfer component that performs the deployment modeling tasks of the ordered series of deployment modeling tasks, resulting in a second deployment of the data storage system being created on a second computing device that is distinct from the first computing device.

In another aspect, a method is described herein. The method can include associating, by a first system operatively coupled to a processor, respective properties of a first deployment of a second system on a first computing device with respective automation mapping functions; executing, by the first system, the automation mapping functions in an order defined by dependencies between respective ones of the automation mapping functions, resulting in a series of system modeling tasks and an order associated with the series of system modeling tasks; and performing, by the first system, the series of system modeling tasks in the order associated therewith, resulting in a second deployment of the second system being created on a second computing device that is distinct from the first computing device.

In an additional aspect, a non-transitory machine-readable medium including executable instructions is described herein. The instructions, when executed by a processor, can facilitate performance of operations including associating respective properties of a first deployment of a data storage system as implemented on a first computing site to respective automation mapping functions according to deployment data associated with the first deployment; executing the automation mapping functions in an order defined by dependencies between respective ones of the automation mapping functions, resulting in an ordered series of deployment transfer tasks corresponding to the respective ones of the automation mapping functions; and executing the ordered series of deployment transfer tasks, resulting in a second deployment of the data storage system being created on a second computing site that is distinct from the first computing site.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Figure 1:
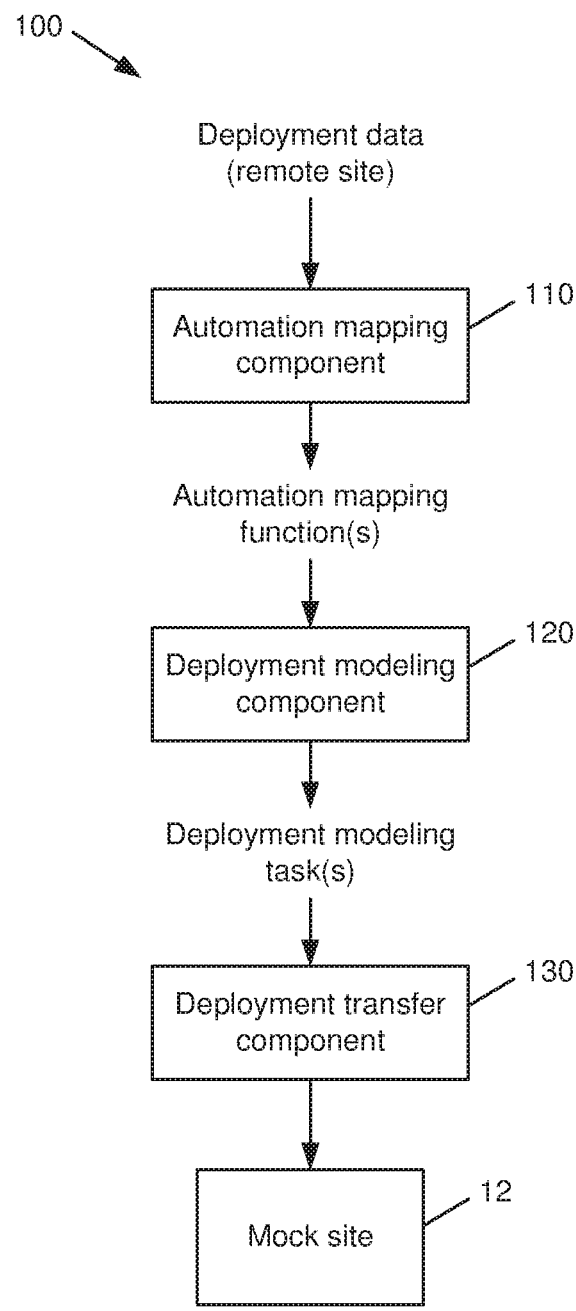
FIG. 1 is a block diagram of a system that facilitates automated mocking of computer system deployments in accordance with various aspects described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

The present disclosure provides techniques, e.g., as implemented via systems, methods, and/or computer program products, that facilitate a fully-automated framework for modeling deployments of a computer system (e.g., one or more computing devices, such as computing devices logically arranged in a cluster or other grouping, that run a system of software). This modeling can, in turn, facilitate the reproduction of use cases and/or configurations of the computer system, e.g., for purposes of testing.

As stated above, computing system hardware and/or software can behave in widely different ways depending on the particular users, configurations, and/or other properties of specific implementations of that hardware and/or software. In some cases, this potential for divergence can result in the state and/or action space of a computing system to be of sufficiently high dimensionality that exhaustive testing (e.g., testing for every potential system configuration that can be employed by the system) can be practically infeasible. Additionally, configuration data associated with a large, complex computing system can be of sufficiently large size and scope that a human could not collect or process said data in a timeframe that would be useful or reasonable, e.g., for the purpose of testing features of the computing system.

In view of at least the above, various aspects described herein provide a fully automated end-to-end solution for producing a mock computing system for the purpose of testing. For instance, various aspects described herein can retrieve aspects of a system deployment, which can include the physical configuration of the deployment, its software configuration, its interactions with its environment, etc. Additionally, various aspects provided herein can utilize specific automation algorithms to recreate a system deployment from its collected data for testing and/or other related uses. By facilitating automated system testing, e.g., according to various aspects as described below, cost and/or time savings can be achieved as compared to similar techniques in which human testers are utilized. In addition, automated system testing can make the testing process less error prone, e.g., by reducing the potential for human error in the testing process, especially for repetitive tasks.

By implementing automated computer system deployment mocking as described herein, various advantages that can improve the functionality of a computing system can be realized. These advantages can include, but are not limited to, the following. Usage of computing resources (e.g., power consumption, processor cycles, network bandwidth, etc.) associated with compiling data associated with a computing system and recreating a computer system from the compiled data can be reduced. An amount of time associated with mocking a computer system can be reduced, e.g., to a useful timeframe for purposes of testing and/or other operations. Increases in testing speed can also enable an increased amount of testing to be performed for a system within a unit timeframe, which can ultimately result in improved software quality. Other advantages are also possible.

With reference now to the drawings, FIG. 1 illustrates a block diagram of a system 100 that facilitates automated mocking of computer system deployments in accordance with various aspects described herein. As shown in FIG. 1, system 100 includes an automation mapping component 110, a deployment modeling component 120, and a deployment transfer component 130, which can operate as described in further detail below. In an aspect, the components 110, 120, 130 of system 100 can be implemented in hardware, software, or a combination of hardware and software. By way of example, the components 110, 120, 130 can be implemented as computer-executable components, e.g., components stored on a memory and executed by a processor. An example of a computer architecture including a processor and a memory that can be used to implement the components 110, 120, 130, as well as other components as will be described herein, is shown and described in further detail below with respect to FIG. 11.

In an aspect, the components 110, 120, 130 can be associated with a computing node and/or other computing device associated with a computing system. Further, the components 110, 120, 130, and/or other components as will be described in further detail below, can be implemented on a same computing device and/or distributed among multiple computing devices.

Returning to FIG. 1, the automation mapping component 110 of system 100 can generate associate respective properties of a deployment of a computing system, e.g., a data storage system or the like, as implemented on one or more computing devices that are remote to system 100, with respective automation mapping functions. For instance, the deployment properties can correspond to the implementation of a system on a cluster, site, or the like, that is distinct from system 100. In an aspect, these deployment properties can be determined based on data collected from the remote computing site or cluster. Techniques that can be utilized for collecting deployment data are described in further detail below with respect to FIGS. 2-3. Additionally, techniques for the selection and use of automation mapping functions are described in further detail below with respect to FIG. 6.

The deployment modeling component 120 of system 100 can execute the automation mapping functions provided by the automation mapping component 110 as described above, resulting in corresponding automation tasks for mocking up the corresponding system deployment. In an aspect, the deployment modeling component can execute the automation mapping functions in an order defined by dependencies between said functions, e.g., as will be described below with respect to FIGS. 5-6, resulting in an ordered series of deployment modeling tasks.

The deployment transfer component 130 of system 100 can perform the respective tasks of the ordered series of deployment modeling tasks produced by the deployment modeling component 120, e.g., in the specified order. In an aspect, performance of the deployment modeling tasks by the deployment transfer component 130 can result in the remote system deployment as described above being recreated at a mock site 12 that can be composed of one or more computing devices or clusters. In respective aspects, the mock site can be implemented as part of system 100 and/or as a computing site outside of system 100. In either of these cases, the mock site 12 can be distinct from the original site on which the system is deployed. An example of a mock system site that can be utilized by the deployment transfer component 130 is described below with respect to FIG. 8.

In an aspect, the components 110, 120, 130 of system 100 can be utilized to provide a whole automated pipeline from a target computing system, a computing system operated by a customer, to a test environment. In doing so, system 100 can enable system developers and/or other users to more readily and efficiently discover and correct bugs that may be encountered by a given computing system in the field.

Figure 2:
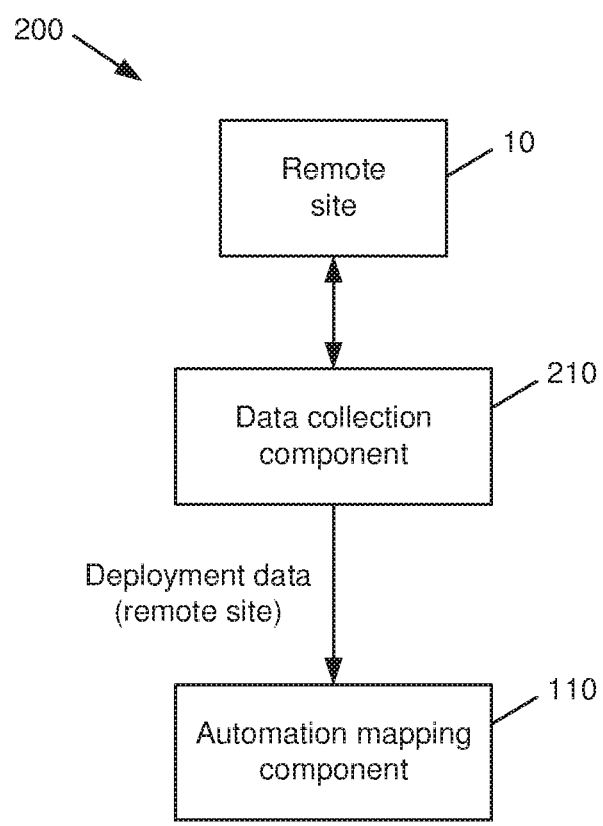
FIG. 2 is a block diagram of a system that facilitates collecting data related to a computer system deployment in accordance with various aspects described herein.

With reference next to FIG. 2, a block diagram of a system 200 that facilitates collecting data related to a computer system deployment in accordance with various aspects described herein is illustrated. Repetitive description of like elements employed in other embodiments described herein is omitted for brevity. As shown in FIG. 2, system 200 can include a data collection component 210 that can be utilized to gather and/or otherwise obtain deployment data, e.g., deployment data as used by the automation mapping component 110, from one or more devices or clusters of a remote site 10. This data can include, but is not limited to, physical configuration data associated with the remote site 10, software configuration data associated with software utilized by the remote site 10, environmental interaction data associated with the remote site 10, and/or other suitable types of information.

Figure 3:
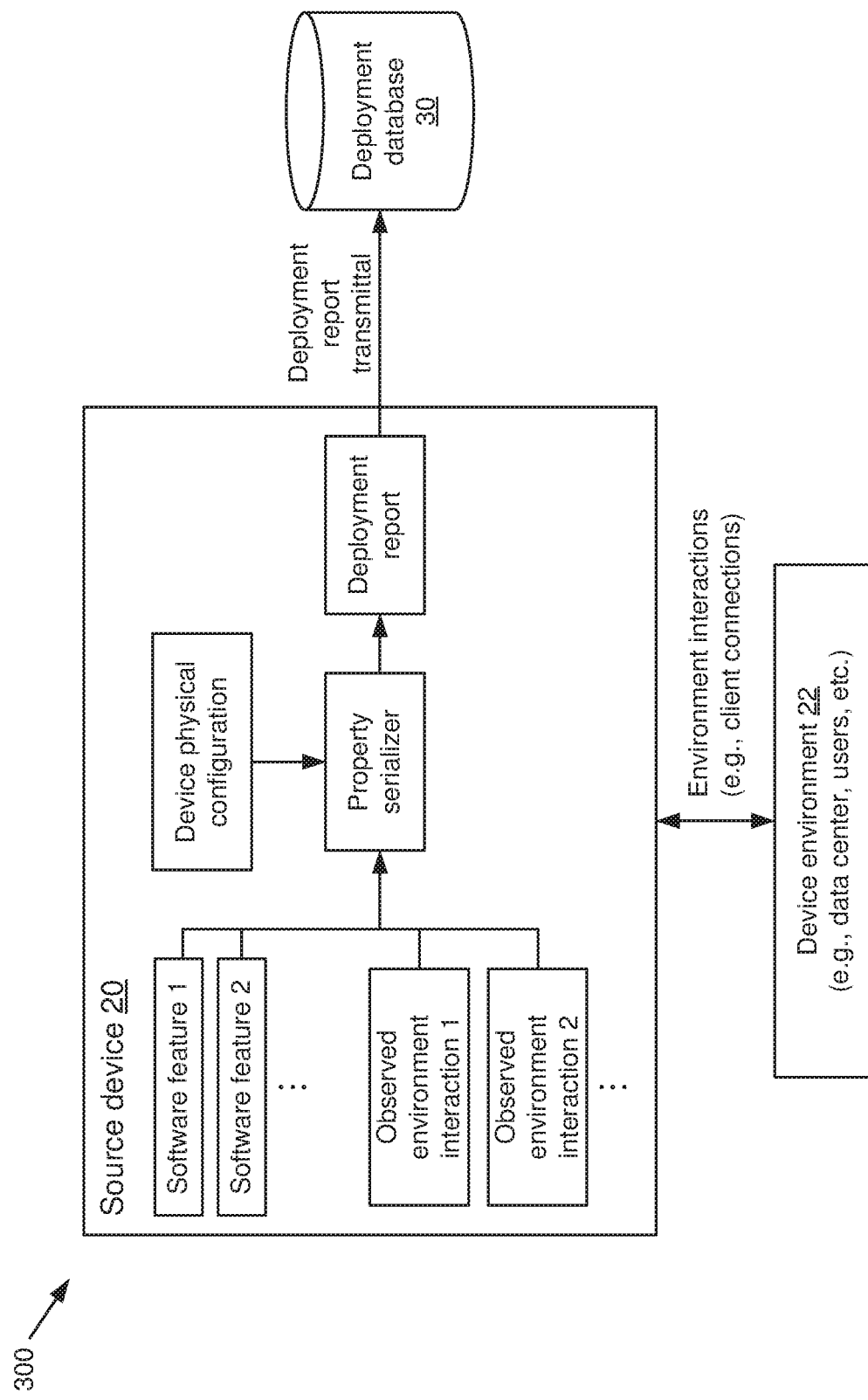
FIG. 3 is a diagram depicting an example model that can be utilized for collecting computer system deployment data in accordance with various aspects described herein.

A specific, non-limiting example of data collection that can be performed by the data collection component 210 is illustrated by diagram 300 in FIG. 3. More particularly, diagram 300 shows an example technique for gathering information about the deployment of a device, referred to in diagram 300 as a source device 20. The source device 20 can be, e.g., a physical device that is manufactured by a system developer and purchased by a given customer, which can additionally run software created and/or supported by the system developer. Alternatively, the source device 20 can be a customer-supplied device that runs software associated with the system developer. It should be appreciated, however, that the techniques described herein can be utilized for a source device 20 that is owned and/or operated by any appropriate entity.

In an aspect, various forms of information regarding the deployment of the source device 20 can be collected to facilitate re-creation of that deployment, e.g., at a test site. Further, collection of data as described herein can be performed according to a pre-existing agreement between an operator of the source device 20 and a system testing entity, e.g., through a purchase or license agreement for the source device 20 or its software, and/or pursuant to any other means by which the operator of the source device 20 can provide affirmative consent to data collection.

Diagram 300 illustrates the various forms of deployment information that can be collected, e.g., so that the deployment can be recreated at a mock site. This information can include, but is not limited to, the following:

1) The physical configuration of the source device 20 to be modeled, which can include factors such as drive types, node counts, or the like.

2) The configuration of the software features of the source device 20. By way of non-limiting example, this can include whether inline compression is enabled at the source device 20 and, if so, the compression algorithm(s) used for the compression.

3) Information about the environment 22 of the source device 20 and interactions between the source device 20 and its environment 22, such as client input/output (I/O) activity, external authentication, networking information, or the like.

In an aspect, collection of the above and/or other data relating to the source device 20 and its environment 22 can be provided via an application telemetry system at the source device 20, which can then transmit the data to the data collection component 210 as described above according to any suitable wired and/or wireless communication technologies. As additionally shown by diagram 300, the deployment information can be serialized so that it can be transmitted, e.g., as a deployment report, from the source device 20 to the data collection component 210 within one or more communication signals. Once received by the data collection component 210, the deployment information can be stored in a deployment database 30 and/or another suitable data structure for later retrieval and processing.

Deployment information can be collected from a source device 20 in any suitable manner. For instance, deployment information can be collected periodically, e.g., according to a specified cadence or time interval. Also or alternatively, deployment information can be collected in response to occurrence of a triggering event. As an example, deployment information can be collected at specified points during the process of investigating issues with the deployment of the source device 20. Other schedules and/or events for collecting information could also be used. Additionally, deployment information can be collected and/or transmitted using any suitable telemetry techniques, including those presently existing or developed in the future.

In an aspect, due to the likelihood of receiving deployment information from a given source device 20 multiple times of the course of the operational life of the source device 20, each deployment report and/or other quantum of deployment information collected from the source device 20 can contain a timestamp or other unique identifier. For instance, a deployment report can be assigned a key that includes a customer identifier associated with the source device 20, a cluster globally unique identifier (GUID) associated with the source device, a timestamp, and/or any other suitable information.

Returning to FIG. 1, given a mock site 12 and a selected deployment report from the deployment information collected as described with respect to FIGS. 1-2, the automation mapping component 110 can map the selected deployment data onto automation, e.g., via automation mapping functions, that mocks up the deployment on the mock site 12. In an aspect, the automation produced via the automation mapping functions (e.g., via the deployment modeling component 120) can be operable to choose an available physical device for testing, e.g., in an associated test lab, that resembles the deployment associated with the deployment data, or alternatively the automation can facilitate the creation of a virtualized device. Once establishing the physical or virtual device at the mock site 12, the automation can replay the software feature configurations given in the deployment data onto the device. Additionally, the automation can select and automate other associated devices, such as network file system (NFS) clients, such that they interact with the mocked up target device and cause said device to perform like it appears in the collected deployment data.

In an aspect, the real or virtual device of the mock site 12 can be defined as performing like it appears in the collected deployment data if it provides the same information as the gathered workload information, if said information were observed in the same way. By way of non-limiting example, statistics can be gathered relating to the number of clients connected to a given cluster and the I/O rates associated with those clients. Those statistics could then be mapped onto automation that causes clients associated with the mock site 12 to subject the mocked device to similar I/O activity, e.g., such that the I/O activity of the mocked device exhibits statistics that match those of the source device by at least a threshold degree, according to a defined threshold.

Figure 4:
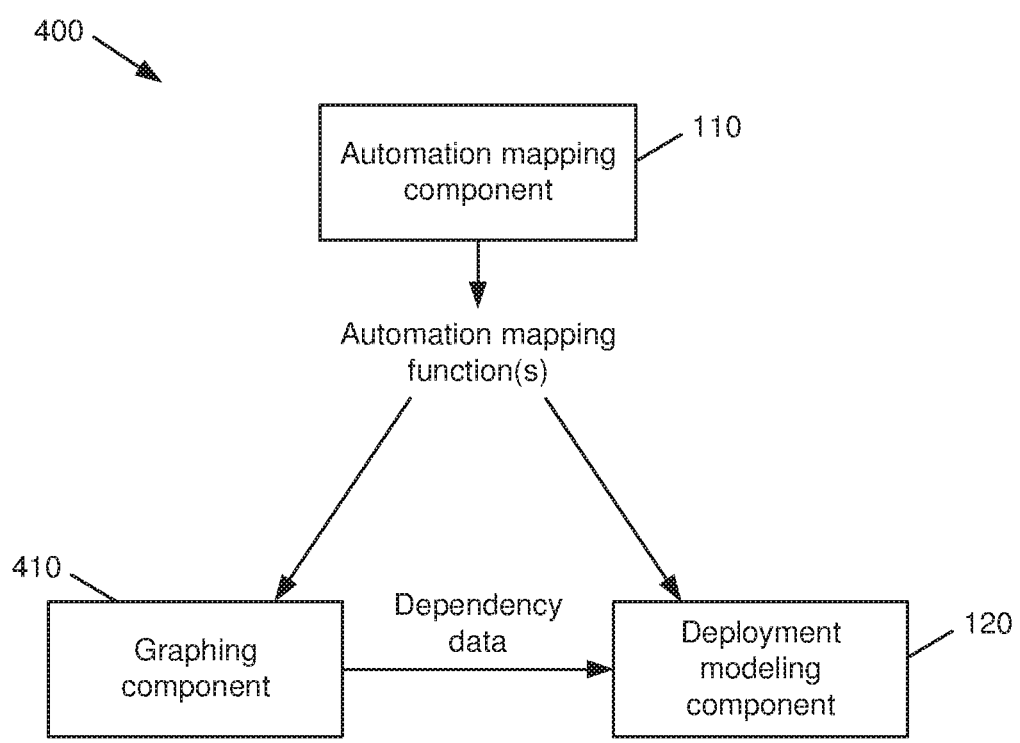
FIG. 4 is a block diagram of a system that facilitates determining dependencies between automation mapping functions in accordance with various aspects described herein.

Turning next to FIG. 4, a block diagram of a system 400 that facilitates determining dependencies between automation mapping functions in accordance with various aspects described herein is illustrated. Repetitive description of like elements employed in other embodiments described herein is omitted for brevity. As shown in FIG. 4, system 400 includes a graphing component 410 that can model dependencies between various aspects of the automation associated with recreating a target deployment, e.g., as given by the automation mapping functions provided by the automation mapping component 110.

In an aspect, the graphing component 410 can be utilized to model dependencies that arise as a result of the automation occurring in several steps where the output from one step can be used as input to later steps. Stated another way, the graphing component 410 can express a dependency between a first automation mapping function and a second automation mapping function in response to an automation task resulting from the first automation mapping function producing an output that is an input to the second automation mapping function. By way of specific, non-limiting example, an automation that creates quotas on individual directories first requires a list of the affected directories, and generating said list of directories in turn requires allocation of a cluster on which they will be created. Other examples are also possible.

Figure 5:
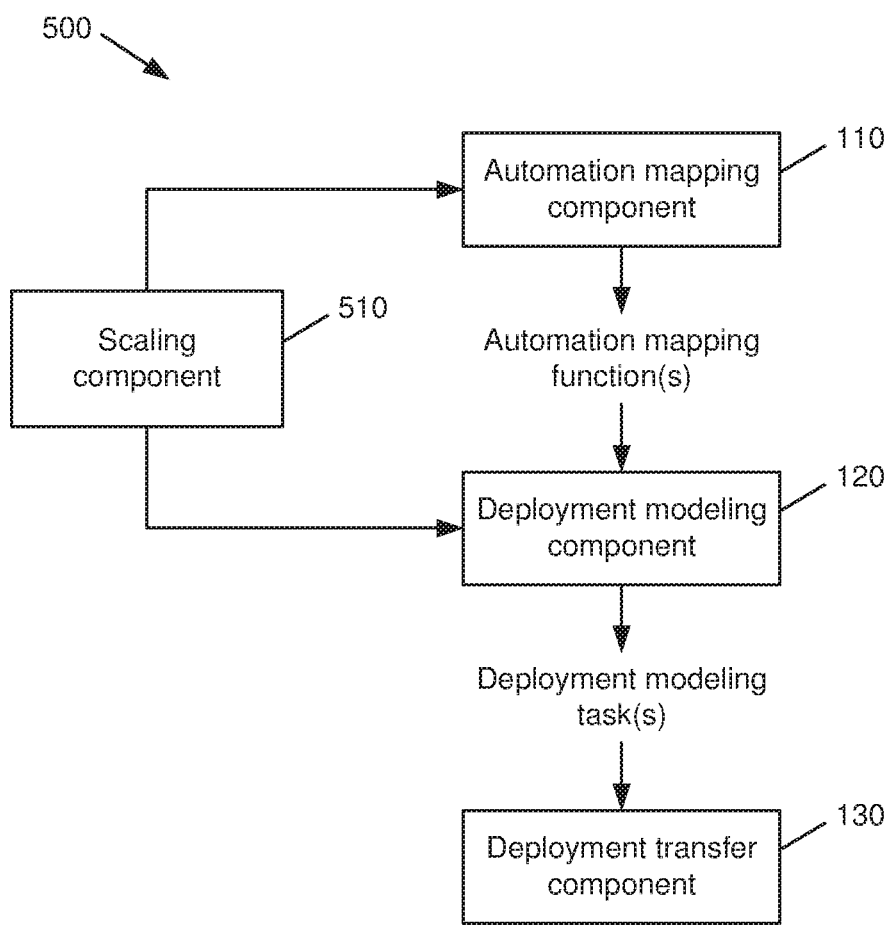
FIG. 5 is a block diagram of a system that facilitates scaling collected computer system deployment data in accordance with various aspects described herein.

Referring next to FIG. 5, a block diagram of a system 500 that facilitates scaling collected computer system deployment data in accordance with various aspects described herein is illustrated. Repetitive description of like elements employed in other embodiments described herein is omitted for brevity. System 500 as shown in FIG. 5 includes a scaling component 510, which can scale at least a portion of a deployment, e.g., as represented by collected deployment data, according to a scaling factor. In an aspect, the scaling factor can be a positive real number that can be used to scale a mock deployment up or down. For instance, a scaling factor of 1.0 results in recreation of a deployment at the same scale as the original deployment.

In an aspect, the scaling component 510, e.g., through scaling factors, can be utilized to run given test scenarios corresponding to a given source device on smaller mock devices (e.g., devices with fewer computing nodes, etc.), thereby reducing capital expenditure, computational costs, and/or other resource use associated with testing a large deployment. For instance, if a deployment is replayed on a significantly smaller cluster, the automation described herein for generating operations from external clients can scale the number of clients and/or their I/O rates such that the observed per-node workload statistics are similar.

Additionally, application of a scaling factor to a mock deployment via the scaling component 510 can result in improved scale invariance in testing. For instance, if two system deployments to be tested are similar except in terms of scale, e.g., due to the deployments utilizing different numbers of computing nodes, the scaling component 510 can scale one or both of the deployments to a common deployment size, obviating the need for exhaustive testing of both deployments due to their similarities.

Figure 6:
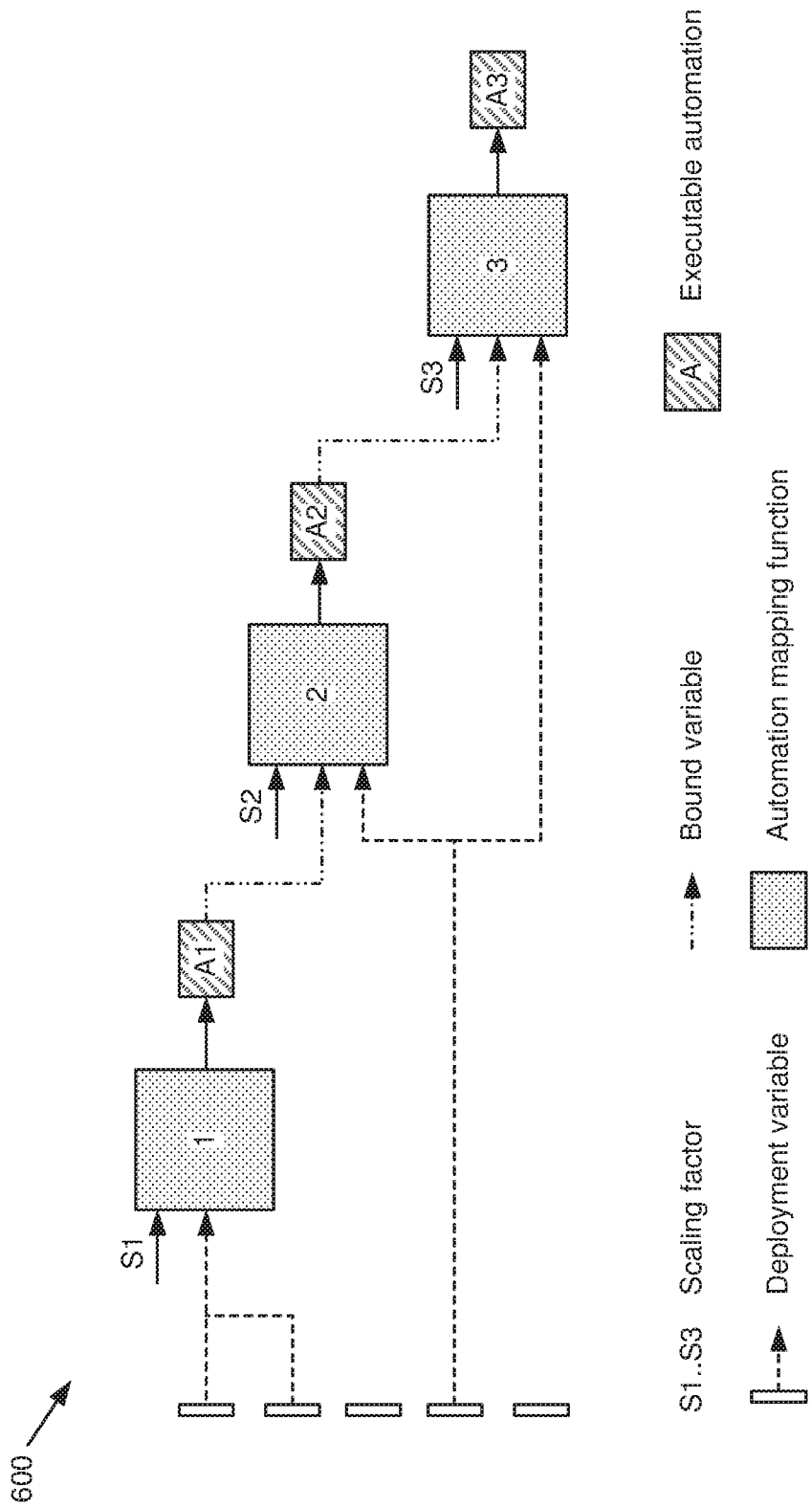
FIG. 6 is a diagram illustrating an example replay algorithm that can be utilized to recreate a computer system deployment in accordance with various aspects described herein.

Referring now to FIG. 6, diagram 600 illustrates an example replay algorithm that can be utilized to recreate a computer system deployment in accordance with various aspects described herein. In an aspect, the algorithm depicted in diagram 600 can accept the following as inputs:

1) Deployment data (e.g., deployment data collected via a data collection component 210 and stored via a deployment database 30), which can be broken into individual variables, defined in diagram 600 as deployment variables, that represent the various aspects of the deployment.

2) A scaling factor, e.g., as described above with respect to FIG. 5. In an aspect, a common scaling factor can be applied to each aspect of the deployment, or different scaling factors, e.g., scaling factors S1-S3 as shown in diagram 600, can be utilized for different properties of the deployment as desirable for testing purposes.

3) A set of automation mapping functions, denoted as functions 1-3 in diagram 600, which are the set of functions that output respective aspects of the automation. In an aspect, the automation mapping functions can be manually provided to the algorithm, e.g., by a tester or other system user, and/or designated through machine learning and/or other suitable means. In a further aspect, the automation mapping functions can be utilized to specialize the illustrated algorithm to a given product.

4) A directed graph (e.g., in the graph theoretic sense of the term) that represents the dependencies between the automation mapping functions, e.g., as described above with respect to FIG. 4. In an aspect, a dependency can be identified between two functions, e.g., a dependency from function X to function Y, if the output of function X is used as an input for function Y. In another aspect, the directed graph provided as input to the algorithm can be acyclic. Alternatively, if the directed graph provided as input to the algorithm is cyclic, the deployment modeling component 120 can output an error condition, e.g., due to one or more dependencies represented by the graph not being possible to satisfy.

As further shown by diagram 600, the automation mapping functions output respective aspects of executable automation, shown in diagram 600 as blocks A1-A3, that can be applied to a mock deployment, e.g., in a test lab. Additionally, the automation mapping functions can output any other information that results from their corresponding automation tasks that are utilized by other automation mapping functions as input. As used herein, automation outputs that are utilized by other automation mapping functions are referred to as "bound variables." As additionally shown by diagram 600, each of the automation mapping functions accepts as inputs some combination of the following:

1) A set of variables of the deployment data, e.g., deployment variables

2) A scaling factor S1-S3

3) A set of bound variables

While diagram 600 illustrates an example with three automation steps for purposes of illustration, it should be appreciated that the algorithm illustrated by diagram 600 could have any suitable number of steps.

To give a specific, non-limiting example of the algorithm shown in diagram 600, the following description considers a reproduction of a deployment of a three-node cluster. In this example, the first step of the process can be to select a target three node cluster, which can be a real cluster (e.g., in a test lab) or a cluster created through virtualization. To perform this step, a first automation mapping function can be utilized that accepts as input all variables of the corresponding deployment data that relate to the physical specifications of the nodes in the cluster. This function can then automate creating and/or selecting such a cluster, and the resultant automation can provide outputs such as the identifiers of the specific nodes the automation created or chose, such as through internet protocol (IP) addresses, host names, etc.

The identifiers and/or other outputs of the initial automation described above can then be provided as bound variable inputs to subsequent automation mapping functions, e.g., in order to inform the subsequent functions as to the specific nodes to be used. Based on this information, subsequent automation mapping functions can produce automation tasks that mock further properties of the deployment. For instance, based on a set of node identifiers and/or other information as provided via an automation task, an automation mapping function can utilize said identifiers as bound variables to recreate a software configuration corresponding to the cluster, e.g., in terms of software features installed, patches that have been applied to the installed software features, whether respective installed software features have been enabled, parameters utilized in operating the enabled software features, directory structures of the cluster, etc. Information relating to the software configuration of the deployment, such as directory paths, associated user identifiers and/or corresponding permissions, or the like, can then be passed to an additional automation mapping function that can create client load on the cluster that is statistically similar to that observed by the original deployment. Additional automation mapping functions and/or corresponding automation tasks are also possible.

An example implementation of the algorithm depicted by diagram 600 is provided in pseudocode format in Table 1 below. The below example utilizes a graph theoretic structure in which the referenced nodes represent the individual mapping functions and dependencies, e.g., the information a given mapping function needs to execute, are represented as directed edges. Additionally, the list of unrun nodes with satisfied dependencies in the below pseudocode represents all nodes that have not yet been run but have the necessary deployment data and bound variables needed to run. Based on this information, the algorithm executes the functions in an order that is an admissible topological sort of the dependency graph.

TABLE 1

Pseudocode for example deployment replay algorithm.

```
deployment_data = get_deployment_data(deployment_id)
bound_variables = { }
runnable_nodes =
  list_of_unrun_nodes_with_satisfied_dependencies(all_nodes,
  deployment_data, bound_variables)
while there exist nodes in runnable_nodes:
  next_node = runnable_nodes.pop( )
  additional_bound_variables = next_node.execute(deployment_data,
     bound_variables, scaling_factor)
  bound_variables.add(additional_bound_variables)
  runnable_nodes =
     list_of_unrun_nodes_with_satisfied_dependencies(all_nodes,
     deployment_data, bound_variables)
if not all nodes were executed:
  # Graph was cyclic, or there were nodes with dependencies that are
  # otherwise impossible to satisfy.
  raise Exception ("The set of dependencies is impossible to satisfy")
```

Figure 7:
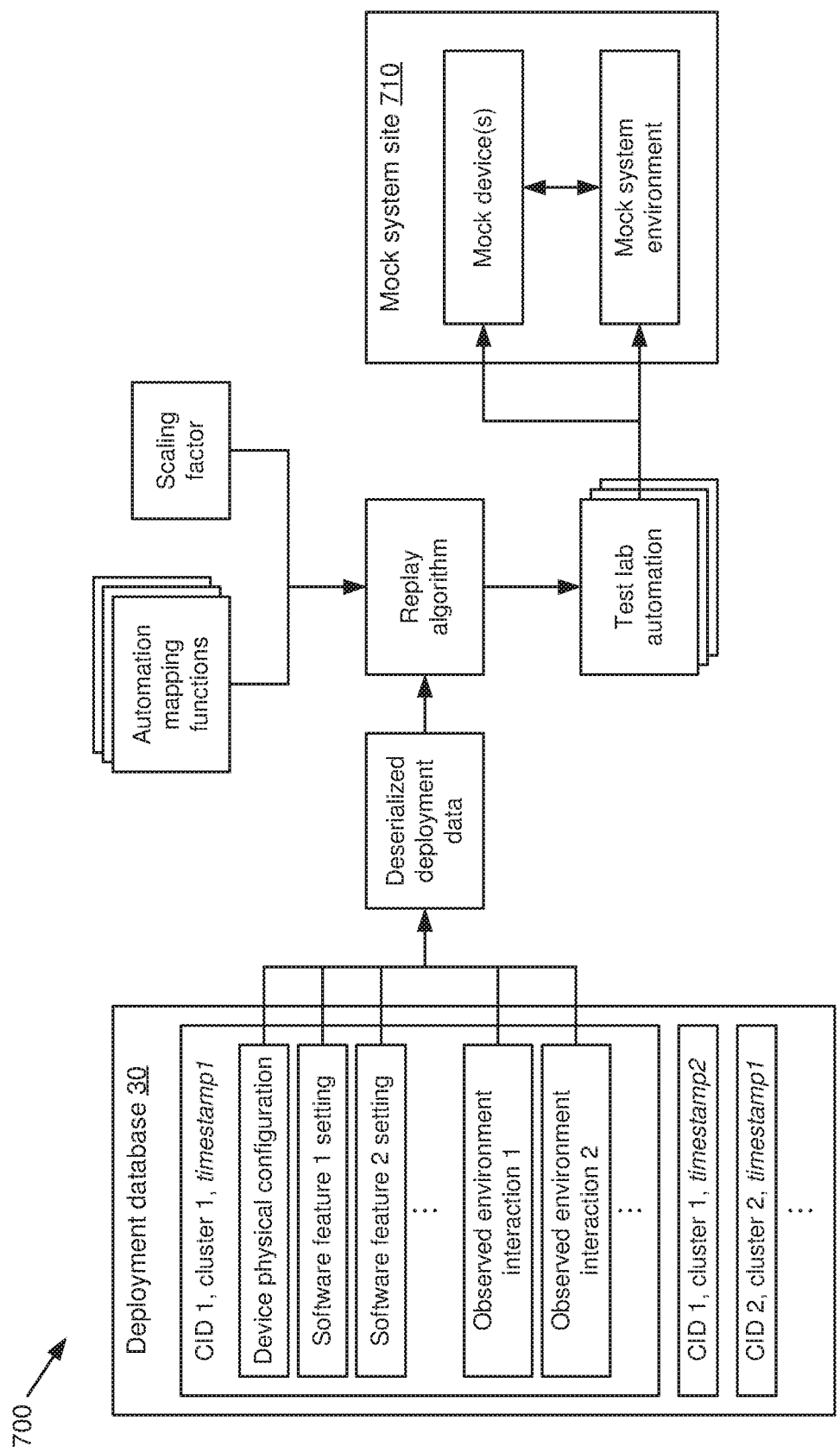
FIG. 7 is a diagram depicting a system architecture for automated creation of a mock system site in accordance with various aspects described herein.

With reference now to FIG. 7, diagram 700 illustrates an example replay pipeline that can be utilized to recreate a computing system deployment, e.g., a deployment represented by data stored in a deployment database 30, to a mock system site 710. As shown in diagram 700, deployment data corresponding to a given source device, e.g., as indicated by a customer ID (CID), cluster identifier, and timestamp, can be deserialized (e.g., to reverse the serialization of the data as shown in FIG. 3), and the deserialized deployment data can be passed to a replay algorithm. The replay algorithm, in turn, can utilize one or more automation mapping functions and/or scaling factors, e.g., as described above with respect to FIG. 6, to produce one or more executable test lab automation tasks. These tasks, when performed, can result in the recreation of the source deployment at a mock system site 710.

Figure 8:
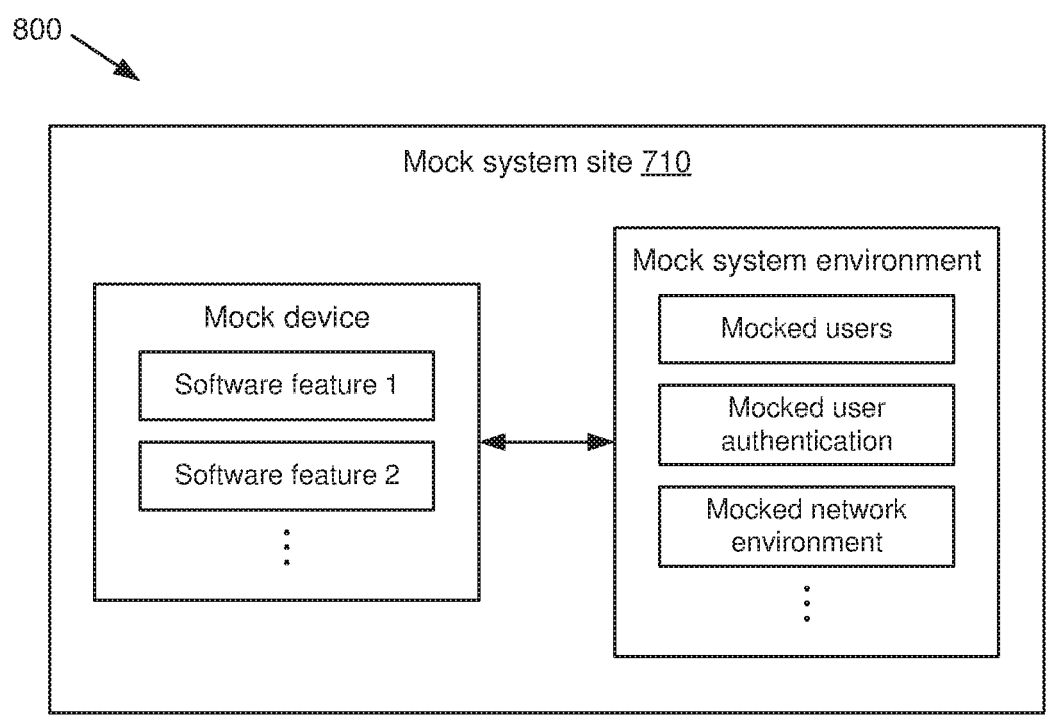
FIG. 8 is a diagram depicting an example structure that can be utilized for the mock system site of FIG. 7 in accordance with various aspects described herein.

As further shown by diagram 800 in FIG. 8, the mock system site 710 resulting from the test lab automation can include one or more mock devices (e.g., computing clusters) as well as a mock system environment. In an aspect, the mock device can be configured with one or more software features and/or other properties, e.g., as generally described above. Further, the mock system environment can include recreated properties of the original source device, such as system users, authentication data associated with those users, a network environment associated with the mock device, etc. Other aspects of the target device and its environment can also be created via the mock system site 710.

Figure 9:
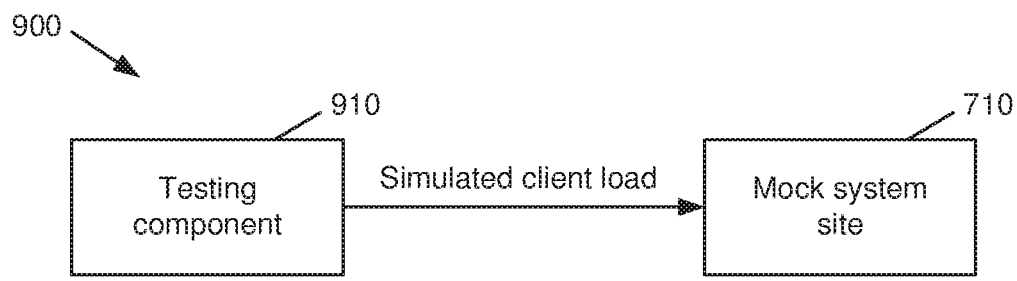
FIG. 9 is a block diagram of a system that facilitates applying a simulated client load to the mock system site of FIG. 7 in accordance with various aspects described herein.

Turning to FIG. 9, a block diagram of a system 900 that facilitates applying a simulated client load to a mock system site 710 in accordance with various aspects described herein is illustrated. Repetitive description of like elements employed in other embodiments described herein is omitted for brevity. As shown in FIG. 9, system 900 includes a testing component 910 that can apply a simulated client load to a mock system deployment created on the mock system site 710 as described above. In an aspect, the testing component 910 can be utilized to run respective tests and checks against the mock device of the mock system site to facilitate quality engineering and/or other purposes.

Figure 10:
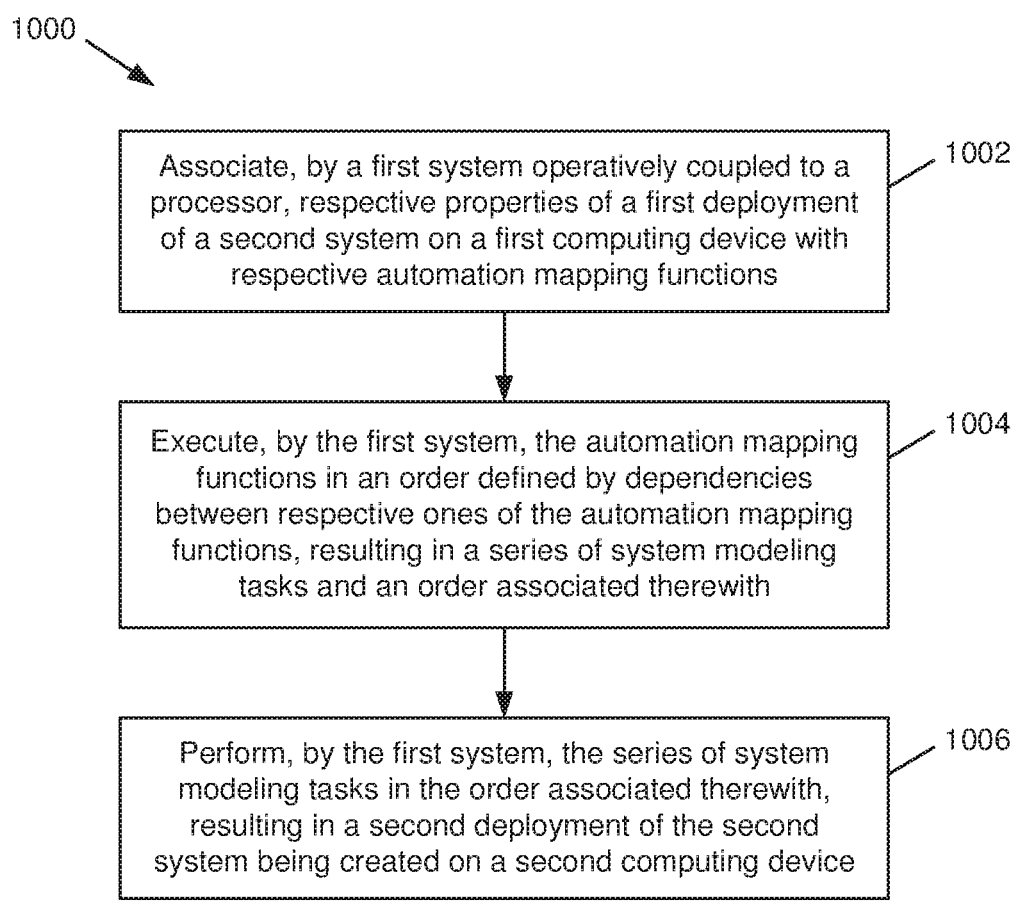
FIG. 10 is a flow diagram of a method that facilitates automated mocking of computer system deployments in accordance with various aspects described herein.

Referring next to FIG. 10, a flow diagram of a method 1000 that facilitates automated mocking of computer system deployments in accordance with various aspects described herein is illustrated. At 1002, a first system operatively coupled to a processor can associate (e.g., by an automation mapping component 110) respective properties of a first deployment of a second system (e.g., a system associated with a source device 20) with respective automation mapping functions.

At 1004, the first system can execute (e.g., by a deployment modeling component 120) the automation mapping functions associated with the deployment properties at 1002 in an order defined by dependencies between respective ones of the automation mapping functions. In an aspect, the actions performed at 1004 can result in a series of system modeling tasks as well as an order associated with said series of tasks.

At 1006, the first system can perform (e.g., by a deployment transfer component 130) the series of system modeling tasks produced at 1004 in the order associated therewith, which can result in a second deployment of the second system being created on a second computing device (e.g., a device associated with a mock site 12, a mock system site 710, or the like).

FIG. 10 as described above illustrates a method in accordance with certain aspects of this disclosure. While, for purposes of simplicity of explanation, the method has been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 11:
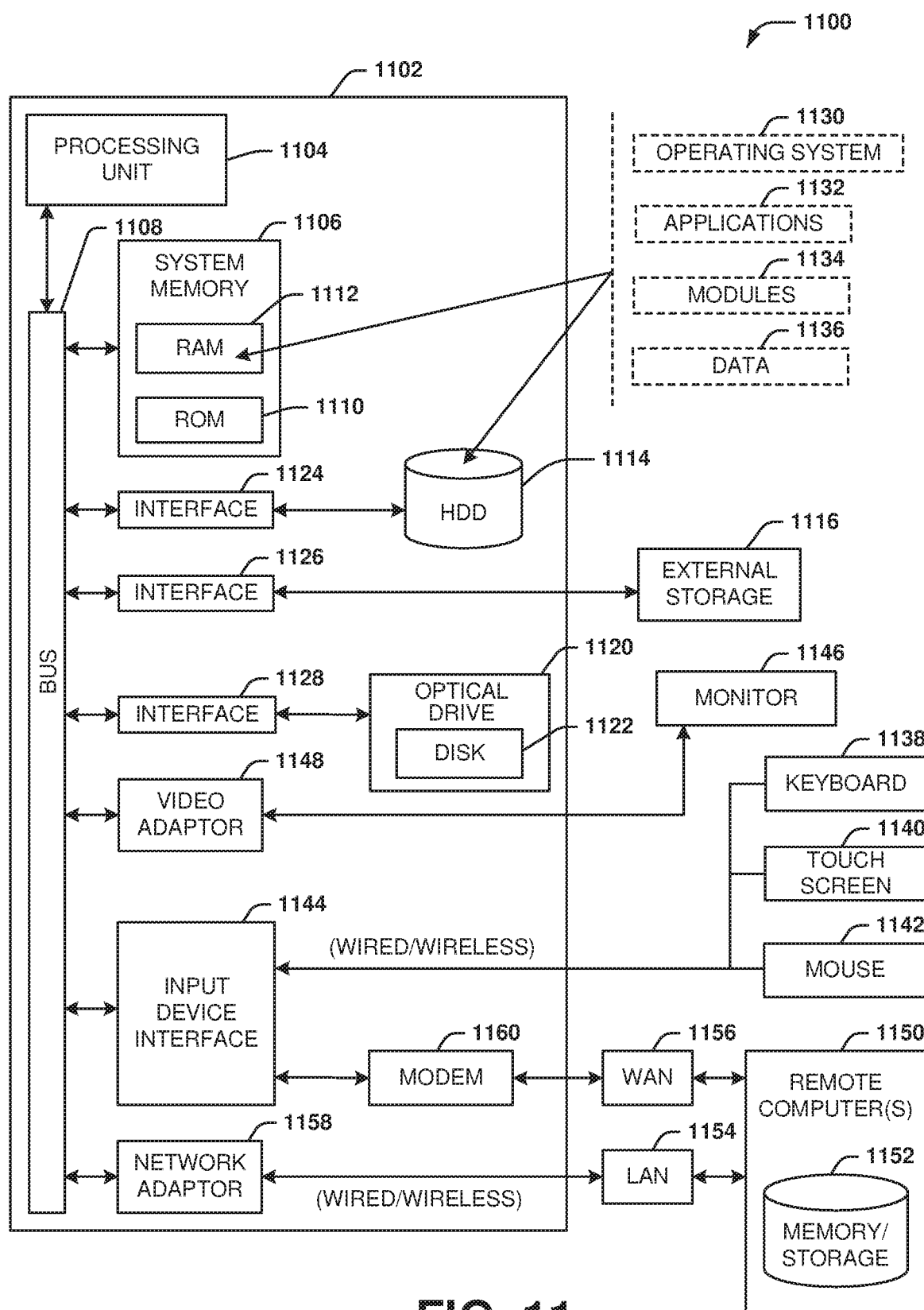
FIG. 11 is a diagram of an example computing environment in which various embodiments described herein can function.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD), a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
 a memory that stores executable components; and
 a processor that executes the executable components stored in the memory, wherein the executable components comprise:
  an automation mapping component that associates respective properties of a first deployment of a computing system on a first computing device with respective automation mapping functions;
  a deployment modeling component that executes the automation mapping functions in an order defined by dependencies between the automation mapping functions, resulting in an ordered series of deployment modeling tasks;
  a deployment transfer component that performs deployment modeling tasks of the ordered series of deployment modeling tasks, resulting in a second deployment of the computing system being created on a second computing device that is distinct from the first computing device; and
  a graphing component that models the dependencies between the respective ones of the automation mapping functions and determines a first dependency, of the dependencies, between a first automation mapping function and a second automation mapping function, of the automation mapping functions, in response to a deployment modeling task, of the ordered series of deployment modeling tasks and resulting from the first automation mapping function, producing an output that is an input variable to the second automation mapping function.

2. The system of claim 1, wherein the executable components further comprise:
 a data collection component that obtains deployment data from the first computing device, wherein the respective properties of the first deployment are based on the deployment data.

3. The system of claim 2, wherein the deployment data comprises data of at least one category selected from a group comprising physical configuration data for the first computing device, software configuration data for software utilized by the computing system on the first computing device, and environmental interaction data associated with the computing system on the first computing device.

4. The system of claim 1, wherein the executable components further comprise:
 a scaling component that scales at least a portion of the respective properties of the first deployment according to a scaling factor.

5. The system of claim 4, wherein the scaling factor is a first scaling factor, wherein the scaling component scales a first portion of the respective properties of the first deployment that is associated with a first one of the automation mapping functions according to the first scaling factor, and wherein the scaling component further scales a second portion of the respective properties of the first deployment that is associated with a second one of the automation mapping functions according to a second scaling factor.

6. The system of claim 4, wherein the first computing device is associated with a first number of first computing nodes, wherein the second computing device is associated with a second number of second computing nodes, and wherein the scaling factor is determined based on a ratio of the first number to the second number.

7. The system of claim 1, wherein the output of the deployment modeling task is a bound variable input for the second automation mapping function.

8. The system of claim 7, wherein the deployment modeling component executes the second automation mapping function based on the bound variable input and one or more deployment variable inputs given by the respective properties of the first deployment.

9. The system of claim 1, wherein the second computing device is a computing device selected from a group comprising a physical computing device and a virtualized computing device.

10. The system of claim 1, wherein the executable components further comprise:
a testing component that applies a simulated client load to the second deployment of the computing system on the second computing device.

11. A method, comprising:
associating, by a first system operatively coupled to a processor, respective properties of a first deployment of a second system on a first computing device with respective automation mapping functions;
executing, by the first system, the automation mapping functions in an order defined by dependencies between respective ones of the automation mapping functions, resulting in a series of system modeling tasks and the order associated with the series of system modeling tasks
performing, by the first system, the series of system modeling tasks in the order associated therewith, resulting in a second deployment of the second system being created on a second computing device that is distinct from the first computing device; and
determining, by the first system, a dependency, of the dependencies, between a first automation mapping function and a second automation mapping function, of the automation mapping functions, in response to a first system modeling task, of the series of system modeling tasks and resulting from the first automation mapping function, producing an output that is an input variable to the second automation mapping function.

12. The method of claim 11, further comprising:
collecting, by the first system, deployment data from the first computing device; and
determining, by the first system, the respective properties of the first deployment based on the deployment data.

13. The method of claim 11, further comprising:
scaling, by the first system, at least a portion of the respective properties of the first deployment according to a scaling factor.

14. The method of claim 13, wherein the scaling factor is a first scaling factor, and wherein the scaling comprises:
scaling a first subset of the respective properties of the first deployment that is associated with a first one of the automation mapping functions according to the first scaling factor; and
scaling a second subset of the respective properties of the first deployment that is associated with a second one of the automation mapping functions according to a second scaling factor.

15. The method of claim 11, further comprising:
wherein the determining of the dependency results in the output of the first system modeling task being a bound variable input for the second automation mapping function.

16. The method of claim 15, wherein the executing comprises executing the second automation mapping function based on the bound variable input and one or more deployment variable inputs given by the respective properties of the first deployment.

17. A non-transitory machine-readable medium comprising executable instructions that, when executed by a processor, facilitate performance of operations, the operations comprising:
associating respective properties of a first deployment of a data storage system as implemented on a first computing site to respective automation mapping functions according to deployment data associated with the first deployment;
executing the automation mapping functions in an order defined by dependencies between respective ones of the automation mapping functions, resulting in an ordered series of deployment transfer tasks corresponding to the respective ones of the automation mapping functions
executing the ordered series of deployment transfer tasks, resulting in a second deployment of the data storage system being created on a second computing site that is distinct from the first computing site;
determining that a first deployment transfer task, of the ordered series of deployment transfer tasks and resulting from a first one of the automation mapping functions, produces an output that is an input variable to a second one of the automation mapping functions; and
assigning a dependency, of the dependencies, between the first one and the second one of the automation mapping functions based on the determining.

18. The non-transitory machine-readable medium of claim 17, wherein the operations further comprise:
scaling at least a portion of the deployment data according to a scaling factor.

19. The non-transitory machine-readable medium of claim 17, wherein the output of the first deployment transfer task is a bound variable input for the second one of the automation mapping functions.

20. The non-transitory machine-readable medium of claim 19, wherein the operations further comprise:
executing the second one of the automation mapping functions based on the bound variable input and one or more deployment variable inputs given by the properties of the first deployment of the data storage system.

* * * * *